United States Patent [19]
Nishikawa et al.

[11] Patent Number: 4,535,652
[45] Date of Patent: Aug. 20, 1985

[54] AUTOMATIC TRANSMISSION AND DIRECT COUPLING CLUTCH FOR VEHICLE

[75] Inventors: Masao Nishikawa, Tokyo; Takashi Aoki, Fujimi, both of Japan

[73] Assignee: Honda Giken Kogyo Kabushiki Kaisha, Tokyo, Japan

[21] Appl. No.: 508,102

[22] Filed: Jun. 27, 1983

[30] Foreign Application Priority Data

Jul. 1, 1982 [JP] Japan ................. 57-114233

[51] Int. Cl.³ .................. F16H 47/00; F16H 45/02
[52] U.S. Cl. .......................... 74/733; 74/866; 192/0.092; 192/3.58; 192/3.3
[58] Field of Search .............. 74/731, 732, 733, 866; 192/3.31, 3.29, 3.28, 3.3, 3.57, 3.58, 0.092

[56] References Cited

U.S. PATENT DOCUMENTS

| 3,948,367 | 4/1976 | Weinrich et al. | 74/733 X |
| 4,002,228 | 1/1977 | Borman | 192/3.3 |
| 4,090,417 | 5/1978 | Burcz et al. | 74/733 X |
| 4,259,882 | 4/1981 | Miller | 74/866 X |
| 4,428,467 | 1/1984 | Hiramatsu | 192/0.092 X |

FOREIGN PATENT DOCUMENTS

| 57-12128 | 1/1982 | Japan | 192/3.3 |
| 57-94163 | 6/1982 | Japan | 192/3.3 |
| 2088494 | 6/1982 | United Kingdom | 192/3.29 |

Primary Examiner—Allan D. Herrmann
Assistant Examiner—Joseph M. Rolnicki
Attorney, Agent, or Firm—Armstrong, Nikaido, Marmelstein & Kubovcik

[57] ABSTRACT

This invention relates to an automatic transmission for a vehicle comprising a torque convertor equipped with a rotary member on the input side and a rotary member on the output side; a semi-direct coupling clutch interposed between both of the rotary members, actuated by a control fluid pressure and capable of mechanically transmitting the torque between both of the rotary members while permitting the slip of rotation therebetween; an auxiliary transmission operatively connected to the torque convertor and adapted to effect the speed change operation in accordance with speed change ratios of a plurality of transmission stages; and a control apparatus for controlling the interconnecting force of the semi-direct coupling clutch in such a manner that the force becomes greater when the auxiliary transmission is operating at the speed change ratio of a higher transmission stage and becomes lower when the auxiliary transmission is operating at the speed change ratio of a lower transmission stage.

9 Claims, 6 Drawing Figures

AUTOMATIC TRANSMISSION AND DIRECT COUPLING CLUTCH FOR VEHICLE

BACKGROUND OF THE INVENTION

This invention relates to an automatic transmission for a vehicle. More particularly, the present invention relates to an automatic transmission having a construction in which a semi-direct coupling clutch is interposed between a rotary member on the input side of a torque convertor and a rotary member on the output side and can mechanically transmit the torque between these rotary members while permitting the slip of rotation between the rotary members and the interconnecting force of this semi-direct coupling clutch is controlled in an interlocking arrangement with the torque convertor in such a manner that the degree of slip of rotation between both rotary members is adjusted in response to the transmission ratio of an auxiliary transmission effecting the speed change operation in accordance with one of transmission ratios of a plurality of stages. The automatic transmission of the present invention can reduce the fuel consumption of the an engine and ensures quiet and smooth driving of a vehicle.

If in a vehicular automatic transmission equipped with a torque convertor, a rotary member on the input side of the torque convertor such as a pump vane wheel and a rotary member on the output side such as a turbine vane wheel are coupled directly and mechanically by a clutch at the stage where the torque amplification by the torque convertor becomes unnecessary, the fuel consumption of the engine can be reduced and a quiet operation of the power transmission system can be obtained. It has been proposed to provide a certain degree of slip of rotation between the input side rotary member and the output side rotary member in order to secure the feeling of smooth driving during the direct coupling operation between both rotary members by a direct coupling mechanism. A direct coupling clutch which can permit such a certain degree of slip of rotation between both rotary members will be hereinafter referred to as a "semi-direct coupling clutch". An example of the semi-direct coupling clutch is disclosed, for example, in Japanese Patent Application No. 157263/1980 filed by the Applicant assignee of the present invention. The semi-direct coupling clutch of this prior art reference includes a recessed tapered surface rotating together with one of the input and output side rotary members, a convex tapered surface rotating together with the other of the rotary members and a plurality of rollers disposed inside a gap defined between the two tapered surfaces in the circumferential direction so as to be twisted with respect to the axes of rotation of both rotary members. A semi-direct coupling clutch of this type can permit the slip of rotation in a satisfactory manner against an excessive transmitted torque and can smoothly transmit the power. However, there are current requirements to reduce more effectively the fuel consumption and to accomplish quieter and smoother power transmission than previously obtainable.

SUMMARY OF THE INVENTION

It is therefore an object of the present invention to provide an automatic transmission which can reduce more effectively the fuel consumption and can accomplish quieter and smoother power transmission than previously obtainable, by controlling more delicately the operation of a semi-direct coupling clutch.

Hereinafter, preferred embodiments of the present invention will be described in detail with reference to the accompanying drawings.

DESCRIPTION OF THE PREFERRED EMBODIMENTS

Figure 1:
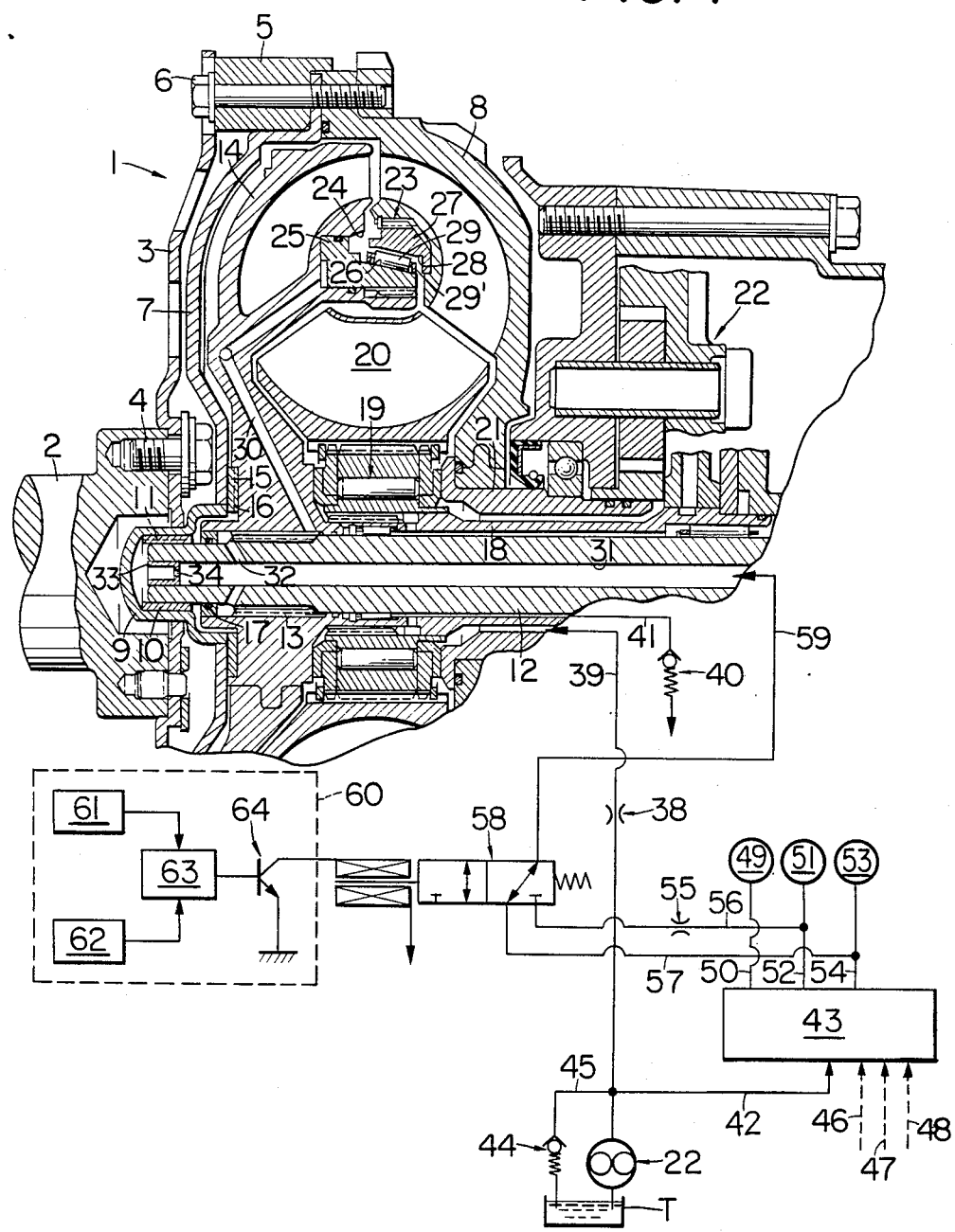
FIG. 1 is a longitudinal section of an automatic transmission for a vehicle in accordance with the present invention together with its oil pressure control circuit.

Referring initially to FIG. 1, the center portion of a torque transmitting plate 3 of a torque convertor 1 is coupled to an input shaft 2, such as the crank shaft of an engine, by a connecting member 4 such as a bolt. The outer circumferential portion of this torque transmitting plate 3 is interconnected to the outer circumferential portion of a pump vane wheel 8 via a spacer 5 and via the outer circumferential portion of a cover 7 of the torque convertor 1 by another connecting member 6 such as a bolt.

A bottomed cylinder portion 9 is formed at the center of the cover 7 to project toward the input shaft 2, and the tip end of an output shaft 12 of the torque converter 1 is fitted into the cylinder portion 9 via a ring-like plain bearing 10 which is equipped with an oil groove 11 in the axial direction. The center portion of a turbine vane wheel 14 is spline-coupled onto that outer circumferential surface of the output shaft 12 close to the tip end by a spline 13. A ring-like thrust washer 15 is interposed between the front surface portion of the turbine vane wheel 14 and the rear surface portion of the cover 7 in order to receive the propelling force of the turbine vane wheel 14 in the axial direction. The thrust washer 15 is equipped with an oil groove 16 extending in the radial direction. A seal member 17 is fitted into a ring-like gap formed between the outer circumferential surface of the output shaft 12 and the inner circumferential surface of the turbine vane wheel 14 at a position between the bearing 10 and the spline 13.

A hollow shaft 18 encompasses concentrically the output shaft 12 at the rear of the spline 13. A stator 20 is mounted to the front end portion of the hollow shaft 18 via a free wheel 19. Another hollow shaft 21 encompasses concentrically the hollow shaft 18, and the inner circumferential portion of the pump vane wheel 8 is fitted onto the outer circumferential surface of the front end of the hollow shaft 21 so as to be rotatable integrally with the hollow shaft 21. The turning force transmitted to the pump vane wheel 8 is transmitted, via the hollow shaft 21, to an oil pressure pump 22 which receives the driving force from the rear end portion of this hollow shaft 21. For the sake of description, this oil pressure pump 22 is also illustrated separately in an oil pressure circuit at the lower right portion of FIG. 1. The rear end portion of the output shaft 12 is connected to the input side of an auxiliary transmission which can select speed ratios over a plurality of stages, as will be described elsewhere.

The pump vane wheel 8 constitutes the rotary member on the input side in accordance with the present invention and the turbine vane wheel 14 constitutes the rotary member on the output side. A ring-like semi-direct coupling clutch 23 is interposed between pump vane wheel 8 and turbine vane wheel 14. The clutch 23 is actuated by a control fluid pressure and can mechanically transmit the torque between the pump vane wheel 8 and the turbine vane wheel 14 while permitting the slip of rotation between these vane wheels 8 and 14.

The semi-direct coupling clutch 23 will now be explained in detail.

A ring-like piston 25, which is equipped integrally with a cylindrical rod having a convex tapered surface 26 on its outer circumferential surface, is fitted into a ring-like cylinder 24 formed on the side of the turbine vane wheel 14 in an axially slidable manner. A ring-like pressure receiving ring 27 having a concave tapered surface 28 on its inner circumferential surface is mounted on the side of the pump vane wheel 8. A larger number of rollers 29 are disposed inside a ring-like gap defined between the convex tapered surface 26 and the concave tapered surface 28 in a mutually spaced apart relation in the circumferential direction with such an arrangement that the direction of the center line 0 of each of the rollers 29 is twisted by an angle of projection $\theta$ with respect to the center line g of the output shaft 12, as shown in FIG. 2, while they are being held by a cage 29'.

When the piston 25 is not receiving the push force towards the pump vane wheel 8 by the action of the later-described control oil pressure, that is, the push force to the right in the drawing of FIG. 1, the pump vane wheel 8 and the turbine vane wheel 14 can rotate freely and relatively to each other, and the power transmitted from the input shaft 2 to the pump vane wheel 8 via the torque transmitting plate 3 is transmitted fluidly to the turbine vane wheel 14 by the operation oil that has been fully charged in the torque convertor 1. If torque amplification develops during this fluid power transmission, the reaction force produced at that time is borne by the stator 20 and when the torque amplification does not occur, the stator 20 is rotated idly by the operation of the free wheel 19. In consequence, all of the pump vane wheel 8, turbine vane wheel 14 and stator 20 rotate in the same direction with one another.

When the piston 25 receives the push force toward the pump vane wheel 8 by the later-described control oil pressure, each roller 29 of the semi-directed coupling clutch 23 is pushed into the concave tapered surface 28 by the convex tapered surface 26 and the pressure receiving ring 27 rotates integrally with the pump vane wheel 8 in the driving direction, that is, in the direction represented by an arrow a in FIG. 2, so that the driving torque on the side of the pump vane wheel 8 is mechanically transmitted to the turbine vane wheel side 14 by the catching operation of each roller 29 due to its rolling rotation. In this case, the semi-direct coupling clutch 23 somewhat permits the slip of rotation between the pump vane wheel 8 as the input side rotary member and the turbine vane wheel 14 as the output side rotary member. The higher the the control oil pressure that pushes the piston 25 toward the pump vane wheel 8, the lower becomes the degree of slip of rotation, and the lower the control oil pressure, the higher becomes the degree of slip.

Figure 2:
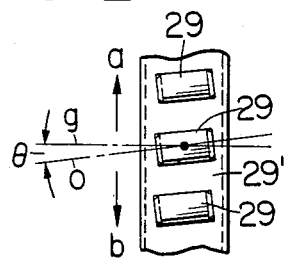
FIG. 2 is an enlarged exploded view of a principal portion of the automatic transmission shown in FIG. 1.

However, when the pressure receiving ring 27 rotates integrally with the pump vane wheel 8 in the non-driving direction, that is, in the direction represented by an arrow b in FIG. 2, the catching operation due to rolling rotation of each roller 29 does not develop. In this case, the power on the side of the pump vane wheel 8 is not transmitted to the turbine vane wheel side 14 via the semi-direct coupling clutch 23. Accordingly, the semi-direct clutch 23 transmits the torque only in the driving direction from the engine to the output shaft 12.

The direct coupling force of the semi-direct coupling clutch 23, that is, the interconnecting force of the clutch 23 for transmitting the power of the pump vane wheel side to the turbine vane wheel side through the mechanical interconnecting operation of the clutch 23, is controlled by the control oil pressure that pushes the piston 25 toward the pump vane wheel 8. The control oil for transmitting this control oil pressure is fed into the cylinder 24 through an oil passage 30 that is defined inside the turbine vane wheel 14.

Another oil passage 31 is formed at the center of the output shaft 12 in the axial direction and control oil introduced into this oil passage 31 flows into a ring-like gap defined between the seal member 17 and the spline 13 through an oil passage 32 that is formed so as to extend from the oil passage 31 to the outer circumferential surface of the output shaft 12. The oil is further sent to the oil passage 30 after passing through the gap of the spline 13 in the axial direction. A part of the control oil inside the oil passage 31 flows out into an operating oil chamber inside the torque convertor 1 through an orifice 34 which is formed in a blind plug 33 fitted into the tip end of the oil passage 31.

Figure 3:
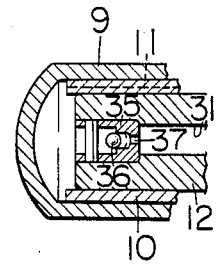
FIG. 3 is a longitudinal section showing a modified example of a principal portion of FIG. 1.

FIG. 3 shows an embodiment in which a blind plug 35 having a different structure is fitted into the tip end of the oil passage 31 in place of the blind plug 33 described above. The blind plug 35 is equipped with a unidirectional orifice 37 which permits the outflow of the control oil only toward the operating oil chamber of the torque convertor 1 from the oil passage 31 due to the operation of a ball 36 but prevents its backflow. In the case of using the blind plug 35 equipped with the unidirectional orifice 37, the responsive operation of the semi-direct coupling clutch 23 for releasing its direct coupling can be sped up by reducing the oil pressure of the control oil fed into the oil passage 31.

The oil pressure pump 22 driven by the power transmitted from the pump vane wheel 8 through the hollow shaft 21, that is, the oil pressure pump 22 shown in the oil pressure circuit at the lower right portion of FIG. 1, sucks the operating oil inside the oil tank T and feeds a part of the oil under pressure into the operating oil chamber of the torque convertor 1 through an oil passage 39 equipped at its intermediate portion with an orifice 38 as well as through a ring-like gap between the hollow shaft 18 and the hollow shaft 21 and also feeds the rest of the oil under pressure to an oil pressure control circuit 43 through an oil passage 42. The excessive oil inside the operating oil chamber of the torque convertor 1 is introduced into an oil cooler, not shown, through the ring-like gap between the output shaft 12 and the hollow shaft 18 and through an oil passage 41 equipped at its intermediate portion with a check valve 40, thus feeding back the cooled oil to the oil tank T. The excessive oil immediately after having been discharged from the oil pressure pump 22 is fed back to the oil tank T through an oil passage 45 equipped at its intermediate portion with a pressure control valve 44.

On the basis of various kinds of input signals such as a shift lever position signal 46 representing the position of a shift lever, a vehicle speed signal 47 representing the speed of a vehicle, a throttle opening degree signal 48 representing the throttle opening degree and the like, the oil pressure control circuit 43 selectively feeds the control oil to an oil passage 50 for supplying the control oil to a frictional engagement portion 49 which transmits the power in the low speed range of the auxiliary transmission driven by the output shaft 12, to an oil passage 52 for supplying the control oil to a frictional engagement portion 51 which transmits the power in the medium speed range and to an oil passage 54 for supplying the control oil to a frictional engagement portion 53 which transmits the power in the high speed range. Each frictional engagement portion may consist of a frictional engagement element such as a multi-plate clutch or a brake band, for example. The auxiliary transmission may have a different number of transmission stages besides the three-stage transmission.

An oil passage 56 equipped at its intermediate portion with an orifice 55 branches from the oil passage 52 and an oil passage 57 branches from the oil passage 54. These oil passages 56 and 57 are selectively communicated with an oil passage 59, which is communicated with the oil passage 31 by an electromagnetic switching valve 58.

The electromagnetic switching valve 58 is controlled and operated by an electronic control circuit 60. In the electronic control circuit 60, a vehicle speed generator 61 generating the vehicle speed signal representing the vehicle speed and a throttle opening degree signal generator 62 generating the throttle opening degree signal representing the throttle opening degree produce their outputs while a computer 63 receives these output signals and sends the output signals to a transistor 64 in accordance with a predetermined reference for judgement so as to apply a current to the electromagnetic switching valve 58.

Figure 4:
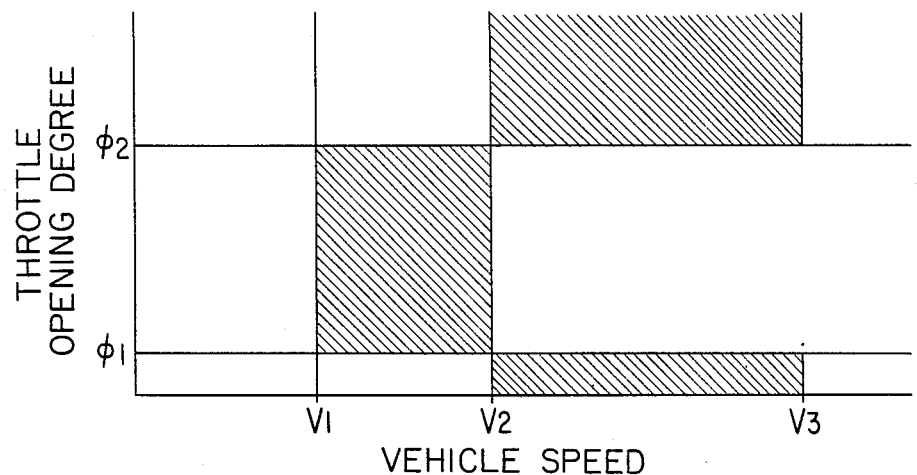
FIG. 4 is a diagram showing the correlation between a vehicle speed and a throttle opening degree as an example of the reference for judgement of an electronic control circuit.

FIG. 4 shows an example of the reference for judgement of the computer 63 in terms of correlation between the vehicle speed and the throttle opening degree. The abscissa represents the vehicle speed V, and the ordinate represents the throttle opening degree $\phi$. The portion represented by oblique lines in the drawing represents the exciting zone of the electromagnetic switching valve 58 and the open portions represent the demagnetization zone.

Figure 5:
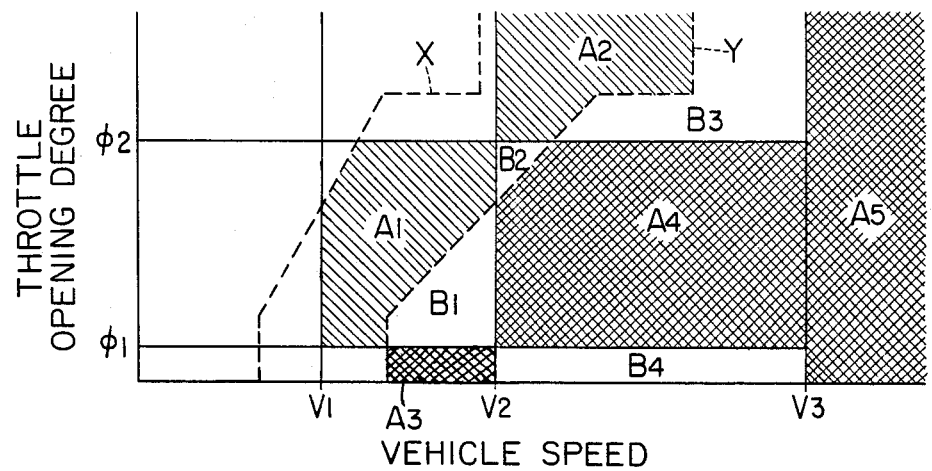
FIG. 5 is a diagram showing the correlation between the vehicle speed and the throttle opening degree and shows the operating range of a semi-direct coupling clutch.

FIG. 5 shows the operating zone of the semi-direct coupling clutch 23 with respect to the vehicle speed V and to the throttle opening degree $\phi$ when the electromagnetic switching valve 58 is excited in accordance with FIG. 4. The abscissa represents the vehicle speed and the ordinate represents the throttle opening degree. The portion represented by oblique lines in the drawing represents the interconnecting zone of the semi-direct coupling clutch 23 and the open portions represent the disconnecting zone of the semi-direct coupling clutch 23. The dotted lines X and Y represent transmission characteristic lines of the auxiliary transmission. The portion on the left of the dotted line X is a low speed range and the portion between the dotted lines X and Y is a medium speed range. The portion on the right of the dotted line Y is a high speed range.

Next, explanation will be made of the operation when the electromagnetic switching valve 58 is excited by the electronic control circuit 60 in accordance with the reference for judgement shown in FIG. 4 in the embodiment illustrated in FIG. 1.

When the engine is operating, the power of the input shaft 2 is transmitted to the pump vane wheel 8 via the torque transmitting plate 3. Because the control oil is fed to the frictional engagement portion 49 from the oil pressure control circuit 43 through the oil passage 50, the control oil is not sent to the semi-direct coupling clutch 23 irrespective of the operating position of the electromagnetic switching valve 58, if the auxiliary transmission is operating in the low speed range, that is, if it is operating in the region on the left of the dotted line X in FIG. 5. Accordingly, the power on the pump vane wheel 8 side is fluidly transmitted to the turbine vane wheel 14 side and the power thus transmitted to this turbine vane wheel 14 is further transmitted to the auxiliary transmission through the output shaft 12.

When the control oil is sent to the frictional engagement portion 51 from the oil pressure control circuit 43 through the oil passage 52 and the auxiliary transmission is carrying out the speed change operation in the medium speed range, that is, in the region between the dotted lines X and Y in FIG. 5, the control oil inside the oil passage 52 also flows into the oil passage 56 equipped at its intermediate portion with the orifice 55. If the electromagnetic switching valve 58 is not excited in this case, the control oil inside the oil passage 56 is cut off by the electromagnetic switching valve 58 so that the control oil is not sent to the semi-direct coupling clutch 23 and the power on the pump vane wheel 8 side is fluidly transmitted to the turbine vane wheel 14 side.

When the vehicle speed V is under the state of $V_1 \leq V < V_2$ and the throttle opening degree $\phi$ is under the state of $\phi_1 \leq \phi < \phi_2$ in accordance with the reference for judgment of FIG. 4, or when the vehicle speed V is under the state of $V_2 \leq V < V_3$ and the throttle opening degree is under the state of $\phi < \phi_1$ or $\phi_2 \leq \phi$, however, the electromagnetic switching valve 58 is excited so that the control oil is sent, after all, to the semi-direct coupling clutch 23 in the zones of the oblique lines $A_1$ and $A_2$ in FIG. 5. In this case, the control oil is contracted by the orifice 55 at the intermediate portion of the oil passage 56 and a part of the control oil reaching the oil passage 31 leaks through the orifice 34 to the operating oil chamber of the torque convertor 1 having a relatively low pressure. Accordingly, the oil pressure lower than the control oil pressure as sent to the frictional engagement portion 51 through the oil passage 52 is transmitted to the semi-direct coupling clutch 23. As a result, the semi-direct coupling clutch 23 transmits the power from the pump vane wheel side to the turbine vane wheel side through its mechanical interconnecting operation while permitting relatively large slip of rotation.

Because the control oil is sent to the frictional engagement portion 53 from the oil pressure control circuit 43 through the oil passage 54, the control oil inside the oil passage 54 is also partly sent to the oil passage 57 if the auxiliary transmission is carrying out the speed changing operation inside the high speed range, that is, in the region on the right of the dotted line Y in FIG. 5. If the electromagnetic switching valve 58 is excited in this case, the control oil inside the oil passage 57 is cut off by the electromagnetic switching valve 58 so that it is not sent to the semi-direct coupling clutch 23 and the power on the pump vane wheel 8 side is fluidly transmitted to the turbine vane wheel 14 side.

However, the electromagnetic switching valve 58 is demagnetized in any of the following cases, i.e., when the vehicle speed V is under the state of $V<V_1$; when the vehicle speed V is under the state of $V_1 \leq V < V_2$ and the throttle opening degree is either $\phi < \phi_1$ or $\phi_2 \leq \phi$; when the vehicle speed V is under the state of $V_2 \leq V < V_3$ and the throttle opening degree $\phi$ is under the state of $\phi_1 \leq \phi < \phi_2$; and when the vehicle speed V is under the state of $V_3 \leq V$. Accordingly, the control oil is sent, after all, to the semi-direct coupling clutch 23 in the zones of the portions of the cross lines $A_3$, $A_4$ and $A_5$. In this case, too, a part of the control oil sent into the oil passage 31 leaks into the operating oil chamber of the torque convertor 1 through the orifice 34 but the amount of leakage at this time is negligibly smaller when compared with the oil amount that is being pressure-fed and hence, the piston 25 is pushed toward the pump vane wheel 8 at a strong pressure which is the substantially rated pressure. As a result, the semi-direct coupling clutch 23 transmits the power from the pump vane wheel 8 to the turbine vane wheel 14 through its mechanical interconnecting operation with almost no slip of rotation.

Figure 6:
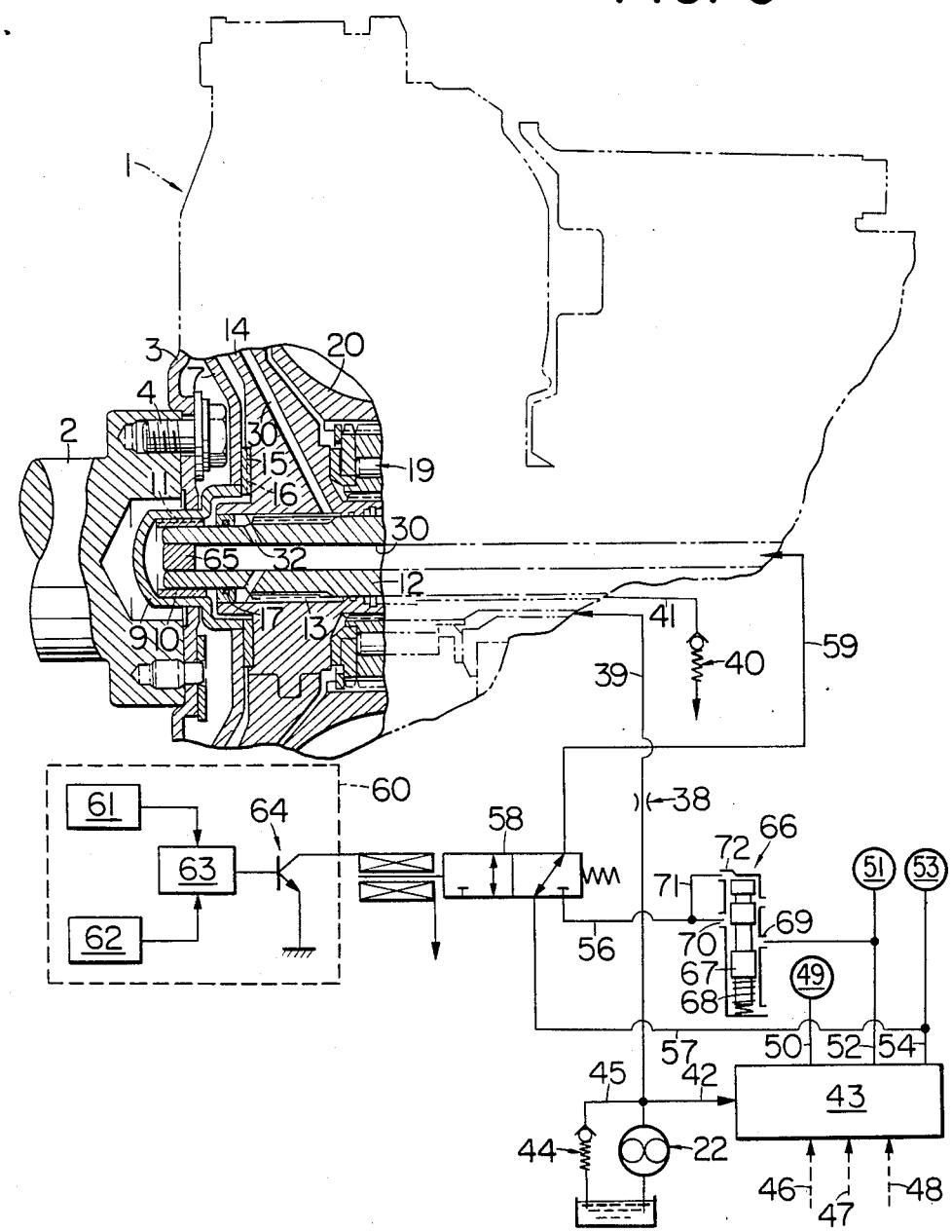
FIG. 6 is a longitudinal section of a modified embodiment of the automatic transmission shown in FIG. 1, together with its oil pressure control circuit.

FIG. 6 illustrates an embodiment in which the tip end of the oil passage 31 is completely closed by a blind plug 65 having no orifice in place of the blind plug 33 equipped with the orifice 34 in the automatic transmission shown in FIG. 1. In this embodiment, a pressure-reducing valve 66 is employed in place of the orifices 34 and 55 shown in FIG. 1. The control oil is forced to branch from the oil passage 52 by the biasing operation of a spool 67 that is unidirectionally biased by a spring 68, and flows into a port 69. The control oil then flows into the oil passage 56 through a port 70. When the oil pressure inside the oil passage 56 exceeds a predetermined pressure, however, the control oil flowing into a port 72 through an oil passage 71 pushes the spool 67 against the spring force of the spring 68 and closes the port 70. Accordingly, the oil pressure inside the oil passage 56 can be kept at a predetermined level which is lower than the pressure in the oil passage 52.

If the spring force of the spring 68 is appropriately set, therefore, the control oil can be sent to the frictional engagement portion 51 from the oil pressure control circuit 43 through the oil passage 52. When the auxiliary transmission is carrying out the speed changing operation in the medium speed range, the semi-direct coupling clutch 23 transmits the power on the pump vane wheel side to the turbine vane wheel side through its mechanical interconnecting operation while permitting relatively large slip of rotation, in the same way as in the case that has been explained with reference to FIG. 1, provided that the electromagnetic switching valve 58 is excited.

Though the foregoing embodiments deal with the case in which the auxiliary transmission is of the three-stage transmission type, the present invention can be applied obviously to an auxiliary transmission of the four-stage transmission type by handling the third and fourth stages in the same way as the medium and high speed stages of the foregoing embodiments.

In the embodiment shown in FIG. 1, it is possible to arrange the orifice 55 having a relatively high degree of contraction at the intermediate portion of the oil passage 56 and also an orifice having a relatively low degree of contraction at the intermediate portion of the oil passage 57.

As described above, the automatic transmission in accordance with the present invention includes a control apparatus which controls the interconnecting force of the semi-direct coupling clutch interposed between the rotary member on the input side and the rotary member on the output side, in response to the speed change ratio of the auxiliary transmission effecting the speed change operation in accordance with a plurality of transmission stages, and this control apparatus controls the interconnecting force of the clutch in such a fashion that the interconnecting force becomes greater when the auxiliary transmission is operating at the speed change ratio of a higher speed stage and becomes smaller when the auxiliary transmission is operating at the speed change ratio of a lower speed stage. With this arrangement, the operation of the semi-direct coupling clutch can be controlled more delicately, the fuel consumption can be reduced and the power transmission can be carried out more quietly and smoothly.

What is claimed is:

1. An automatic transmission for a vehicle, comprising: a torque convertor equipped with a rotary member on the input side and a rotary member on the output side; a semi-direct coupling clutch interposed between both of said rotary members and actuated by a control fluid pressure to mechanically transmit the torque between both of said rotary members while permitting slip of rotation therebetween; an auxiliary transmission operatively connected to said torque convertor and adapted to effect a speed change operation in accordance with speed change ratios of a plurality of transmission stages; and a control apparatus for controlling an interconnecting force of said semi-direct coupling clutch such that the force becomes greater in accordance with operation of said auxiliary transmission at the speed change ratio of a higher transmission stage and becomes lower in accordance with operation of said auxiliary transmission at the speed change ratio of a lower transmission stage.

2. An automatic transmission for a vehicle as defined in claim 1 wherein said auxiliary transmission is constructed so as to change the speed change ratio over a plurality of stages in response to the control fluid pressure and said control apparatus is constructed such that in accordance with operation of said auxiliary transmission at the speed change ratio of a higher transmission stage, the control apparatus feeds a control fluid pressure to the semi-direct clutch which is substantially equal to the control fluid pressure for establishing the speed change ratio of that transmission stage, so as to increase the interconnecting force of said semi-direct coupling clutch, and that in accordance with operation of said auxiliary transmission at the speed change ratio of a lower transmission stage, the apparatus sends a control fluid pressure to said semi-direct coupling clutch which is lower than the control fluid pressure for establishing the speed change ratio of that transmission stage, so as to decrease the interconnecting force of said semi-direct coupling clutch.

3. An automatic transmission for a vehicle as defined in claim 1 or 2 wherein said auxiliary transmission includes a plurality of frictional engagement portions for setting respective speed change ratios, and said control apparatus includes: a switching valve for placing said semi-direct coupling clutch in selective communication with one of a plurality of branch oil passages which branch from a plurality of oil passages adapted for supplying mutually different control fluid pressures to said frictional engagement portions corresponding thereto, said switching valve being interposed between said clutch and said plurality of branch oil passages; a first orifice interposed in one of said branch oil passages so as to generate a control fluid pressure lower than the control fluid pressure for said auxiliary transmission; and a second orifice for discharging a part of the control fluid pressure passing through said switching valve.

4. An automatic transmission for a vehicle, comprising: a torque converter equipped with an input-side rotary member and an output-side rotary member; an auxiliary transmission operatively connected to said torque converter and adapted to effect a speed change operation in accordance with speed change ratios of a plurality of transmission stages; a semi-direct coupling clutch interposed between both the rotary members of the torque converter, said semi-direct coupling clutch being actuated by a control fluid pressure applied thereto in accordance with the operation of said auxiliary transmission at the speed change ratio of predetermined transmission stages, thereby mechanically transmitting torque between the input-side and output-side rotary members while permitting slip of rotation therebetween; and a control apparatus for controlling the interconnecting force of said semi-direct coupling clutch by applying said control fluid pressure to the clutch such that the pressure is reduced by a pressure-reducing means in accordance with the operation of said auxiliary transmission at a speed change ratio of a lower stage of said predetermined transmission stages.

5. An automatic transmission as defined in claim 4, wherein said predetermined transmission stages further include a stage higher than said lower stage and said control fluid pressure is also used to establish the speed change ratio of the predetermined transmission stages, whereby when the auxiliary transmission is operating at the speed change ratio of said higher stage of the predetermined transmission stages the semi-direct coupling clutch is supplied with control fluid pressure substantially equal to the control fluid pressure for establishing the speed change ratio of said higher stage.

6. An automatic transmission as defined in claim 5, wherein said auxiliary transmission is of a three-stage transmission type and said higher stage of the predetermined transmission stages is a high speed stage while said lower stage is a medium speed stage.

7. An automatic transmission as defined in claim 4, wherein said control apparatus includes a plurality of separate oil passages adapted to selectively apply said control fluid pressure to the semi-direct coupling clutch in accordance with establishment of the speed change ratios of said respective predetermined transmission stages and said pressure-reducing means comprises an orifice disposed in one of said separate oil passages through which said control fluid pressure is supplied to said clutch when said lower stage is established.

8. An automatic transmission as defined in claim 7, wherein said pressure-reducing means further includes means adapted to discharge part of the control fluid pressure applied through said one of said separate oil passages.

9. An automatic transmission as defined in claim 4, wherein said control apparatus includes a plurality of separate oil passages adapted to supply said control fluid pressure to the semi-direct coupling clutch in accordance with the selection of the speed change ratios of said respective predetermined transmission stages and said pressure-reducing means comprises a pressure-reducing valve disposed in one of said separate oil passages through which said control fluid pressure is fed when said lower stage is established.

* * * * *